United States Patent [19]

Zeller

[11] Patent Number: 4,669,927
[45] Date of Patent: Jun. 2, 1987

[54] DEEP HOLE DRILLING MACHINE

[75] Inventor: Bruno Zeller, Lauterstein, Fed. Rep. of Germany

[73] Assignee: Oberlikon-Boehringer GmbH, Göppingen, Fed. Rep. of Germany

[21] Appl. No.: 885,747

[22] Filed: Jul. 21, 1986

Related U.S. Application Data

[63] Continuation of Ser. No. 528,969, Sep. 2, 1983, abandoned.

[30] Foreign Application Priority Data

Sep. 6, 1982 [DE] Fed. Rep. of Germany ....... 3233059

[51] Int. Cl.⁴ .............................................. B23B 39/04
[52] U.S. Cl. ........................................ 408/13; 82/2 B; 408/11; 408/12; 318/572; 364/474
[58] Field of Search ....................... 408/10, 11, 12, 13; 82/34 R, 2 B; 364/474; 318/570, 572

[56] References Cited

U.S. PATENT DOCUMENTS

| | | | |
|---|---|---|---|
| 3,635,108 | 1/1972 | Prince | 82/1 R |
| 3,661,463 | 5/1972 | Brainard et al. | 356/73 |
| 3,821,921 | 7/1974 | Rosenberg | 408/10 X |
| 3,832,082 | 8/1974 | Judge, Jr. | 408/10 |
| 3,884,580 | 5/1975 | Webster et al. | 356/106 R |
| 4,025,218 | 5/1977 | Logan et al. | 408/10 X |
| 4,153,382 | 5/1979 | Mueller | 408/10 |
| 4,157,231 | 6/1979 | Phillips | 408/13 X |
| 4,340,326 | 7/1982 | Buonauro et al. | 408/11 X |
| 4,354,404 | 10/1982 | Ramusino | 82/2 D |
| 4,384,332 | 5/1983 | McMurtry | 364/474 |
| 4,417,816 | 11/1983 | Kindl et al. | 82/34 R |
| 4,428,055 | 1/1984 | Kelley et al. | 364/474 |
| 4,502,823 | 3/1985 | Wronski et al. | 408/11 X |
| 4,561,058 | 12/1985 | McMurtry | 408/13 X |

Primary Examiner—Eugene F. Desmond
Assistant Examiner—Glenn L. Webb

[57] ABSTRACT

A deep hole drilling machine having a drill headstock and a drilling carriage, and a drill guide carriage disposed between them, at least two of these three units being displaceable on the machine bed, and the workpiece and/or the drill tube being rotatable. This machine is designed such that differences in workpiece or drill lengths, workpiece inaccuracies and different hole starting and hole finishing movements can be provided for automatically. This is accomplished by providing a length measuring system on each of the displaceable units; the reading made by each measuring system will depend on the position of its unit with respect to a reference point on the fixed unit. A comparator compares the relative positions of the displaceable units, while an evaluating circuit is provided for controlling the movement of at least one of the units on the basis of the readings made after the workpiece and the drill have been inserted into the machine.

12 Claims, 6 Drawing Figures

DEEP HOLE DRILLING MACHINE

This application is a continuation of application Ser. No. 528,969 filed Sept. 2, 1983, now abandoned.

BACKGROUND OF THE INVENTION

The invention relates to a deep hole drilling machine having a workpiece headstock, a drilling carriage, and a drill guide carriage, and of these three systems at least two are displaceable on the machine bed, and the workpiece and/or the drill tube are mounted for rotation according to the type of operation being performed.

Machines of this kind consist normally of a machine bed with guides on which a workpiece headstock, a drill tube guide carriage with replaceable drilling oil feeder, and a drilling carriage having a drilling headstock with separate drive or with a drilling saddle are disposed. The workpiece and the drill tube can be supported by a roller steady rest or a drill tube support. For adaptation to different workpiece lengths, the drill tube guide carriage or the workpiece headstock can be movable. It is also possible for both the workpiece headstock and the drill tube guide carriage to be movable, but in this case the guide carriage is movable only to a limited extent, e.g., over a distance of 120 mm. In all three versions of the machines the drilling carriage is displaceable together with the drill headstock or with the steady rest.

In the machining of a rotation-symmetrical workpiece, the drill can stand fast and the workpiece can rotate, or vice versa; it is also possible for the workpiece and drill to rotate contrariwise.

In deep hole drilling machines it is known to set the drilling depths, workpiece length tolerances and starting hole and breakthrough movements by means of cam switches, decade switches, gauges and digital indicators or to feed them to a control circuit. These things are very time-consuming to set up, chiefly on account of the considerable length of the machine and the distance that has to be covered by the operator on this account.

It is the object of the invention to construct the deep hole drilling machine of the kind described such that different workpiece and drill lengths, workpiece tolerances, various drilling depths and hole starting and hole finishing movements can be provided for without the need for manual set-up operations.

DESCRIPTION OF THE INVENTION

This problem is solved in accordance with the invention in that a length measuring means is disposed on each of the displaceable units and the measurements made thereby depend on the relative position of the corresponding displaceable unit on the machine bed with respect to a reference point on the fixed unit, that a comparator is provided for the comparison of the relative positions of the displaceable units, and an evaluation circuit is provided for the control of the length of the movement of at least one of the displaceable units according to the measurements made by the measuring means after a workpiece and a drill have been mounted in the machine.

If one sets out, for example, from a deep hole drilling machine whose workpiece headstock is fixedly disposed and whose drill tube guide carriage and drilling carriage can be moved along the machine bed, a typical reference point of the machine is located at the nose of the spindle in the workpiece headstock. When the machine is first started up, the length measuring devices disposed on the drill tube guide carriage and on the drilling carriage are calibrated to the reference point of the workpiece headstock. For this purpose the drill tube guide carriage and the drilling carriage each have a reference point which can be located on the end face opposite the workpiece headstock. For the calibration of the measuring devices the drill tube guide carriage can be brought up to the spindle nose (zero position) or the distance between the two units can be measured and preset at the measuring apparatus. In the same manner, the distance between the drill tube guide carriage and the drilling carriage can be measured and preset at the measuring apparatus of the drilling carriage.

If a workpiece is then inserted into the machine, its length can differ from the prescribed length considerably, in the case of very long workpieces, on account of manufacturing inaccuracies. Nevertheless, the length variations are compensated for and the actual length does not have to be determined separately for the machining, but will result automatically due to the movement of a reference coordinate system to the point of contact between the drill and the workpiece on the basis of the length which has to be traveled for the chucking of the drill by the drill tube guide carriage, which carries a drilling oil feeding apparatus which is urged tightly against the workpiece. In this length measurement, provision can be made automatically for the chucking device on the spindle and the drilling oil feeder by appropriate input to the evaluating circuit.

The normally known length of the drill is determined by moving the drilling carriage such that the tip of the drill coincides with the reference point on the drill tube guide carriage. The drilling carriage measuring device then gives the length of the drill. Here, again, a chucking means disposed on the drilling carriage can be allowed for. If the drill is to rotate in the machining operation, a drill headstock can be placed on the drilling carriage. The reference point of the drilling carriage is then best situated at the nose of the spindle. It is also possible, however, to place a drilling rest on the drilling carriage.

For the drilling of through-holes it is no longer necessary to specify the drilling depth. In this case it is necessary only that the drill length be greater than the workpiece length. In the case of countersunk bores and blind holes, however, it is easy to enter the drilling depth.

Since the workpiece length without the clamping components surrounding it is subject to considerable variation of the order of several centimeters, long take-up movements or constant adaptation procedures may be necessary. These changes of distance between the drilling carriage or drilling oil feeder and the workpiece have to be measured manually by the operator of the machine and individually adapted by manual operations.

In order to detect such workpiece length variations automatically, a sensor can be placed ahead of the drilling oil feeder, and can be fixedly connected to the drilling oil feeder or drill tube guide carriage. When the workpiece is clamped up before being machined, the drill tube guide carriage can be fast-fed toward the workpiece. As soon as a certain distance from the workpiece is reached, the sensor puts out a signal which, through the evaluating circuit, reduces the feed of the drill tube guide carriage to low speed, so that the drilling oil feeder is gently brought into contact with the workpiece. By this automatic adaptation to the workpiece inaccuracies, a considerable amount of changeover time can be saved without requiring additional operating procedures.

In deep hole boring, the hole starting and hole finishing procedures are performed at a speed lower than the normal deep hole drilling speed. The take-up movements necessary for this purpose are adjusted in the known machines by means of switching cams, and in the case of CNC control systems they are programmed, or in the case of manual operation they are made manually. This requires additional adjustments or inputs in each case.

In the proposed machine, such procedures can be eliminated. As soon as a workpiece is mounted, that is, as soon as the drilling oil feeder on the drill tube guide carriage contacts the end of the workpiece, the precise length of the workpiece is known on the basis of the measuring device disposed on the guide carriage; furthermore, the position of the extremity of the workpiece with respect to the drill tip is known. It is thus possible to control the drill feed such that first a rapid advancement is performed, and the hole starting and hole finishing processes are performed at reduced speed. Hole starting and hole finishing movements typical for each drill result from the diameter and the angle of inclination of the cutting edges at the drill tip. In the hole starting operation, allowance is best made for the distance which the drill must travel in the workpiece until a gauge located at the drill tip is providing guidance within the workpiece.

BRIEF DESCRIPTION OF THE DRAWING

The invention will be explained below by way of example, with the aid of FIGS. 1 to 6.

DETAILED DESCRIPTION OF THE PREFERRED EMBODIMENTS

Figure 1:
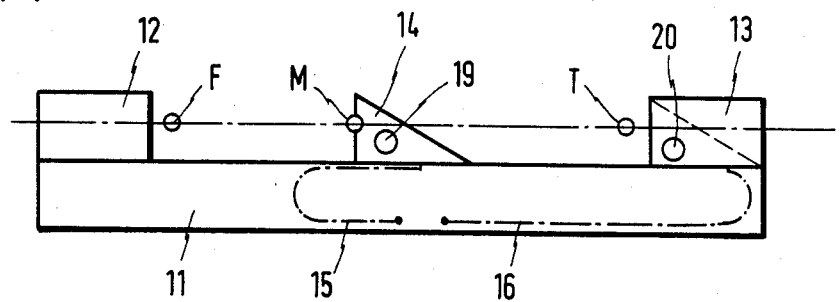
FIGS. 1 to 3 are diagrammatic representations of deep-hole drilling machines in different embodiments.

The deep hole drilling machine represented in a simplified manner in FIG. 1 consists of a machine bed 11 on whose ways a workpiece headstock 12, a drilling carriage 13 and a drill tube guide carriage 14 are disposed. The workpiece headstock 12 is fixedly disposed, while the other two units are movable, as indicated by the power supply lines 15 and 16. The drilling carriage 13 can accommodate a center rest or a drill headstock; this depends on whether the workpiece rotates or not. The drill tube guide carriage 14 carries a drill tube guide bearing, which is not shown, as well as a drilling oil feeder which also is not shown.

Each of the three units 12 to 14 has a reference point F, M and T, respectively. The reference point F of the workpiece headstock is on or at the nose of the spindle, which is not shown, the reference point M on the end of the drill tube carriage 14 or of the drill tube guide bearing, as the case may be, facing the workpiece headstock 12, and the reference point T is located on the nose of the spindle of a drill headstock or the end of a drill socket of a drill tube chuck.

Components such as steady rests for the drill and the workpiece are not shown in the simplified representation given in FIG. 1.

A length measuring system 19 is disposed on the drill tube guiding carriage 14, and another one 20 on the drilling carriage 13. The calibration of these length measuring devices, which have indicators and can be in the form of digital counters, is performed when the machine is first placed in operation. For this purpose, the drill tube guiding carriage 14 is shifted leftward until the reference points F and M coincide. The calibration can also be performed by measuring a certain length between F and M and presetting it on the measuring system 19. The latter method can be used also for the purpose of calibrating the measuring device 20 on the drilling carriage 13.

If a drill is inserted into the machine such that its tip coincides with M, the length of the drill is given by the relative positions of the measuring devices 19 and 20. The same applies to a workpiece held between F and M. Allowance must be made for holding means situated at F, M and T in regard to the length both of the drill and of the workpiece. These, however, are typical values which can be taken care of in an evaluating circuit, which is not shown.

Figure 2:
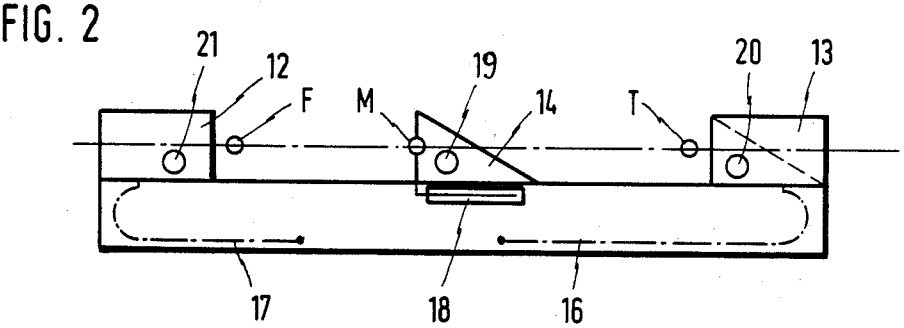

As soon as drill and workpiece are mounted in the machine and the workpiece is clamped up, all of the necessary dimensions and positions needed for a through-hole, a counterbored hole or a blind hole are known. Thus, if the hole depth is entered in the evaluating circuit, the drilling carriage feed can be controlled in the necessary manner. The feed of the drill tube guiding carriage 14 can also be operated through the evaluating circuit such that the workpiece will be clamped up. For this purpose the guiding carriage 14 is displaced from any desired position until the drilling oil feeder comes in contact with the workpiece. The actual length of the workpieces, which depends on the manufacturing inaccuracies, is in this case unimportant and requires no special measurements or set-up operations, since the length of the workpiece is measured by the measuring means 15 when the workpiece is clamped up by the drill tube guide carriage 14 and its drilling oil feeder, and thus the required length of the feed of the drilling carriage 13 is also established FIG. 2 shows an embodiment in which all three units 12 to 14 are displaceable, as indicated by the power supply line 17 of the workpiece headstock 12 and the hydraulic cylinder 18 on the drill tube guiding carriage 14. In this case, the workpiece headstock 12 also has a length measuring means 21, whose calibration is performed with reference to the drill tube guiding carriage 14 whose movement is limited. This guiding carriage can be clamped in a particular position on the bed ways, and can be shifted by means of the hydraulic cylinder 18 by a certain amount of, for example, 120 mm, to clamp up the workpiece. The calibration of the measuring devices 20 and 21 with respect to the drill tube guiding carriage 14 is performed in the position in which the clamping stroke of the guiding carriage amounts to zero.

Figure 3:
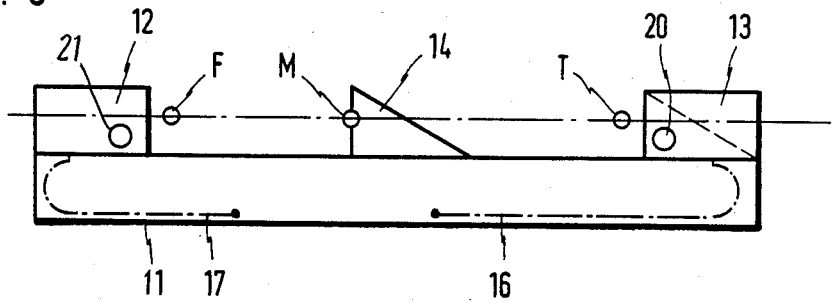

FIG. 3 shows an embodiment in which the workpiece headstock 12 and the drilling carriage 13 are movable, but the drill tube guiding carriage 14 is fixed.

Figure 4:
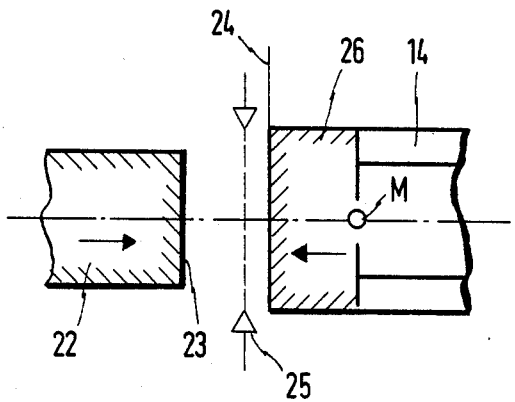
FIGS. 4 and 5 show the arrangement of a sensor on the drill tube guiding carriage.
Figure 5:
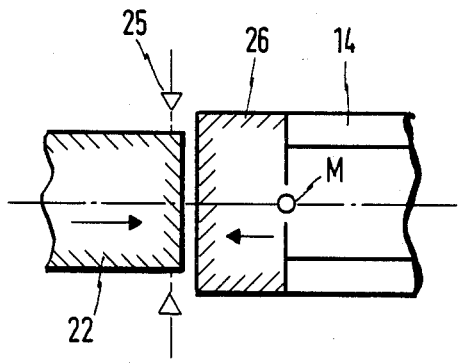

FIGS. 4 and 5 show a portion of a drill tube guiding carriage 14 or of the drill tube guiding bearing, as the case may be, on which a drilling oil feeder 26 is disposed. In front of the contact surface 24, at a point between the drilling oil feeder 26 and the contact surface 23 of a workpiece 22, a sensor 25 is disposed transversely of the drilling center, being constituted by a light source and a photodiode and being displaceable together with the guiding carriage 14. As soon as the guiding carriage 14 approaches the workpiece 22 and the end of the workpiece passes through the sensor 25, a signal is given to the evaluating circuit so that, by means of a control signal, the rate of advancement of the guiding carriage 14 can be shifted to low speed, so that the drilling oil feeder 26 comes gently into contact with the workpiece 22. In this manner it is thus possible to perform the clamp-up quickly, reliably and in a shock-free manner.

Figure 6:
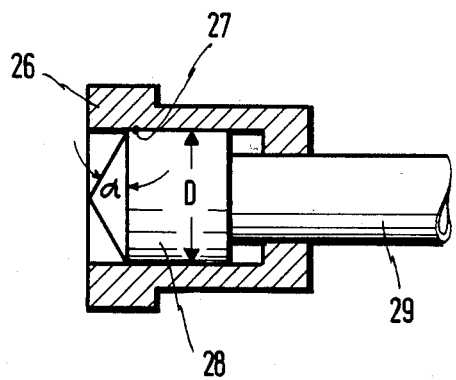
FIG. 6 is a representation to illustrate the required hole-starting movement of a tool.

FIG. 6 shows a drill head 28 mounted on a drill tube 29 inside of a drilling oil feeder 26 and a drill tube guiding bearing. The drill head has a guiding gauge which is not shown, by means of which the drill is guided in the workpiece as soon as point 27 is situated inside of the workpiece.

The drill 28 has a conical tip and a cutting edge sloping at an angle α. When the drilling is started, the drill feed must be performed at reduced speed until the full diameter D of the drill is in the workpiece, and preferably until the tip 27 is in the workpiece, as previously mentioned. Also when the drill emerges from a through-bore, the drill feed must be performed at low speed until the full diameter D of the drill emerges from the workpiece. Provision can be made for these hole starting and drill emergence portions of the drill feed through the evaluation circuit, since the position of the drill tip with respect to the reference points M and T includes the workpiece length and hence the hole depth.

I claim:

1. Deep hole boring machine comprising: a machine bed; workpiece headstock means, drilling carriage means, and drill guiding carriage means on said machine bed; said drill guiding carriage means being disposed between said headstock means and said drilling carriage means, at least two of said means being movable along the machine bed; at least one of said headstock means and drill guiding carriage means having rotatable means for a workpiece and drill tube respectively, length measuring and compensating systems disposed on each of said movable means for determining the relative position of the respective movable means on the machine bed with respect to a reference point on a fixed one of said means for establishing a movable coordinate system centered according to the exact point of contact between the drill tip and the end of the workpiece and determining the actual length of a drill after insertion into the drilling carriage means by shifting the drill guiding means until coincidence is reached between the drill tip and the reference point of the drill guiding means whereby variations in drill length are automatically compensated for and determining the actual length of a workpiece after mounting by clamping it between said fixed means and said drill guiding carriage whereby variations in workpiece length are automatically accounted for so that the depth of a drilled hole is measured with reference only to the location of the contact between the workpiece and the drill; a comparator for comparing the relative positions of the movable means; a drilling oil feeding apparatus, an evaluation circuit operatively connected to said sensor for controlling the length of movement of at least one of said movable means in accordance with the determination of the measuring systems after insertion of a workpiece and drill into the machine to compensate for length tolerances of the workpiece.

2. A machine according to claim 1, wherein the workpiece headstock means is fixedly disposed on the machine bed, and the drilling carriage means and the drill tube guide carriage means are movable.

3. A machine according to claim 1, wherein the workpiece headstock means and the drilling carriage means are movable, and the drill tube guide carriage means is fixedly disposed.

4. A machine according to claim 1, wherein the workpiece headstock means and the drilling carriage means are movable, and the drill tube guide carriage means is movable to a limited extent only.

5. A machine according to claim 1, wherein said workpiece headstock means has a spindle nose, and the reference point of the headstock means is the spindle nose.

6. A machine according to claim 1, wherein the reference point of the drill tube guide carriage means is an end thereof facing the headstock means.

7. A machine according to claim 1, wherein on the drilling carriage means there is disposed a drill headstock with a spindle nose on which the drilling carriage means reference point lies.

8. A machine according to claim 1, wherein on the drilling carriage means a drilling support is disposed having an end facing the drill tube guide carriage means on which lies the drilling carriage means reference point.

9. A machine according to claim 1, wherein the measuring systems have indicator means.

10. A machine according to claim 1, wherein the measuring systems are digital counters.

11. A machine according to claim 1, wherein the sensor consists of a light source and a photodiode which are disposed transversely of a path of movement of the movable means.

12. A machine according to claim 1, wherein said evaluation circuit is operatively connected to said sensor such that upon passage of a workpiece end by said sensor a signal for controlling the evaluation circuit is produced for changing fast feed of the drill tube guide carriage means to a clamping speed at which the drilling oil feeding apparatus comes into contact with the workpiece.

* * * * *